United States Patent [19]
Perstnev et al.

[11] Patent Number: 6,057,378
[45] Date of Patent: May 2, 2000

[54] PROCESS FOR IMPROVING THE THERMAL INSULATION OF HEAT INSULATING ARTICLES

[75] Inventors: Alexander Perstnev; Samuel Perstnev, both of Kiryat Malachi, Israel

[73] Assignee: Isoltherm A.P. Ltd., Israel

[21] Appl. No.: 08/855,351

[22] Filed: May 13, 1997

[30] Foreign Application Priority Data

Sep. 12, 1996 [IL] Israel ........................................ 119251

[51] Int. Cl.$^7$ ....................................... C08J 9/00
[52] U.S. Cl. ........................... 521/123; 521/130; 521/155
[58] Field of Search .................................... 521/155, 123, 521/130

[56] References Cited

U.S. PATENT DOCUMENTS

| | | | |
|---|---|---|---|
| 3,661,620 | 5/1972 | Dekking et al. ........................... | 521/76 |
| 4,795,763 | 1/1989 | Gluck et al. ............................... | 521/99 |
| 4,966,919 | 10/1990 | Williams, Jr. et al. .................... | 521/54 |
| 5,006,564 | 4/1991 | Noonenbruch et al. ................... | 521/54 |
| 5,037,859 | 8/1991 | Williams, Jr. et al. ................... | 521/134 |
| 5,721,281 | 2/1998 | Blount ...................................... | 521/155 |
| 5,786,398 | 7/1998 | Mulls et al. .............................. | 521/131 |

*Primary Examiner*—John M. Cooney, Jr.
*Attorney, Agent, or Firm*—Ostrolenk, Faber, Gerb & Soffen, LLP

[57] ABSTRACT

A process for improving the thermal insulation properties of articles such as jackets or slabs made of open cells polymeric foam material is disclosed. A viscous solution is prepared, capable of coating the inner walls of the passages interconnecting the cells. Particles of a size less than the minimum diametrical length of the passages are mixed with the solution. The article is soaked with the mixed solution, squeezed and dried, so that the particles dispersed within the passages partly block the flow of air between adjacent cells.

20 Claims, 9 Drawing Sheets

PROCESS FOR IMPROVING THE THERMAL INSULATION OF HEAT INSULATING ARTICLES

BACKGROUND OF THE INVENTION

The present invention relates to thermal insulation products, and more particularly to piping, vessels and the like fluid conduits or containers thermal insulation envelops.

These products, usually in the form of sleeves or slabs, are customarily made of foamed polymeric material, mostly polyurethane ( hereinafter "PU") in elastic or in rigid forms.

Due to the inherent, open cell structure of PU, it is regarded as less efficient than other, closed cells or pores polymers (e.g. foamed rubber, commercially known under the tradenames "ARMOFLEX" and "VIDOFLEX"), since the closed cells structure avoids convection heat dissipation by the flow of air between and through the open cells.

On the other hand, the closed pores polymers are inferior in other respects: low temperature resistivity and loosing of elasticity upon heating up to elevated temperatures (bendable only up to about 90° C.)—whereas these restrictions do not apply to PU products.

It is therefore the general object of the invention to improve the thermal insulation properties of PU and similar open-cells polymers.

It is a further object of the invention to apply a process for treating PU products so that flow of gas between the cells will be considerably restricted.

It is a still further object of the invention to provide a process through which suitably sized particles are deployed along walls of the passages between adjacent cells, thus impeding the undesirable flow of air.

SUMMARY OF THE INVENTION

According to the invention there is thus provided a process for improving the thermal insulation properties of articles, such as jackets or slabs, made of polymeric foam material having open cells, communicated by passages. The method comprises preparing a viscous solution capable of coating the inner walls of the passages and mixing the solution with solid particles of a size less than the minimum diametrical length of the passages. The article is then soaked with the mixed solution and dried, so that the particles adhered to the passages walls partly block the flow of air between adjacent cells.

BRIEF DESCRIPTION OF THE DRAWINGS

These and additional features and advantages of the invention will become more clearly understood in the light of the following description of some preferred embodiments thereof, given by way of example only, with reference to the accompanying drawings, wherein.

DETAILED DESCRIPTION OF THE PREFERRED EMBODIMENTS

Figure 1A:
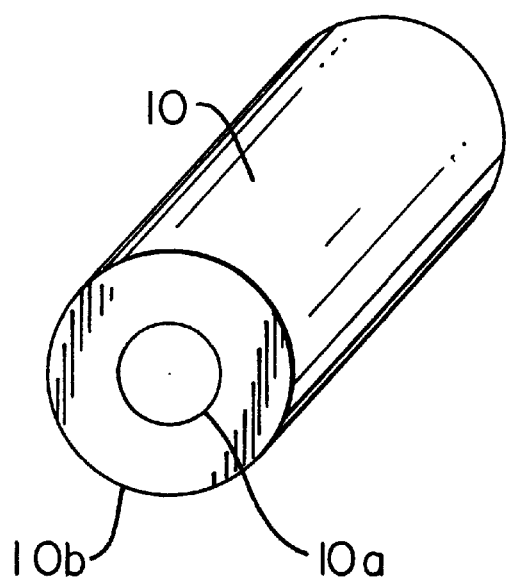
FIG. 1a shows a typical insulation piping jacket.

In FIG. 1a a first typical insulation product is illustrated, namely a piping sleeve 10 having an inner throughgoing hollow 10a and an outer cylindrical contour 10b.

Figure 1B:
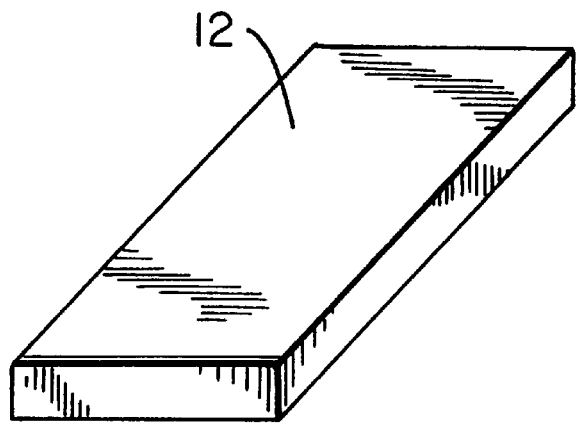
FIG. 1b shows a typical insulation slab.

FIG. 1b shows another widely spread product in the form of a board or slab 12. While the invention will be exemplified with regard to a sleeve-shaped article, it should be emphasized that it is equally applicable to any other shape.

Figure 2:
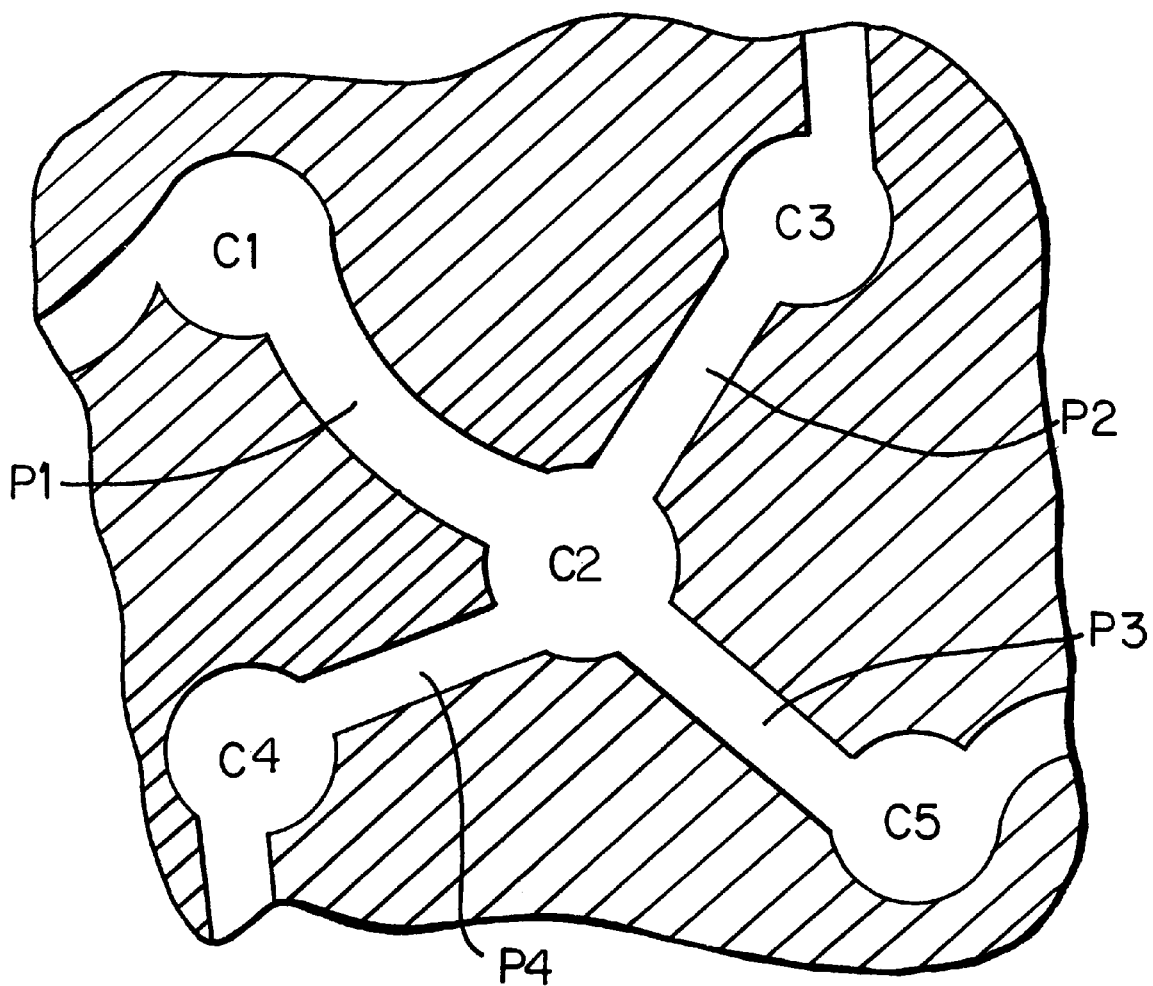
FIG. 2 is a schematic sectional view (in 2 dimensions) of an open-cell polymeric structure.

The inner texture of an open-cell or pores polymer, such as PU, shown in FIG. 2 (in a projected, 2-dimensions form), is characterized by a multitude of cells $C_1, C_2, C_3, \ldots$ etc., connected by passages $P_1, P_2, P_3 \ldots$ etc.

As explained, this very feature of the material makes it's thermal insulating capability poorer, while the process of this invention aims to overcome this disadvantage in the manner that will now be explained.

Figure 3:
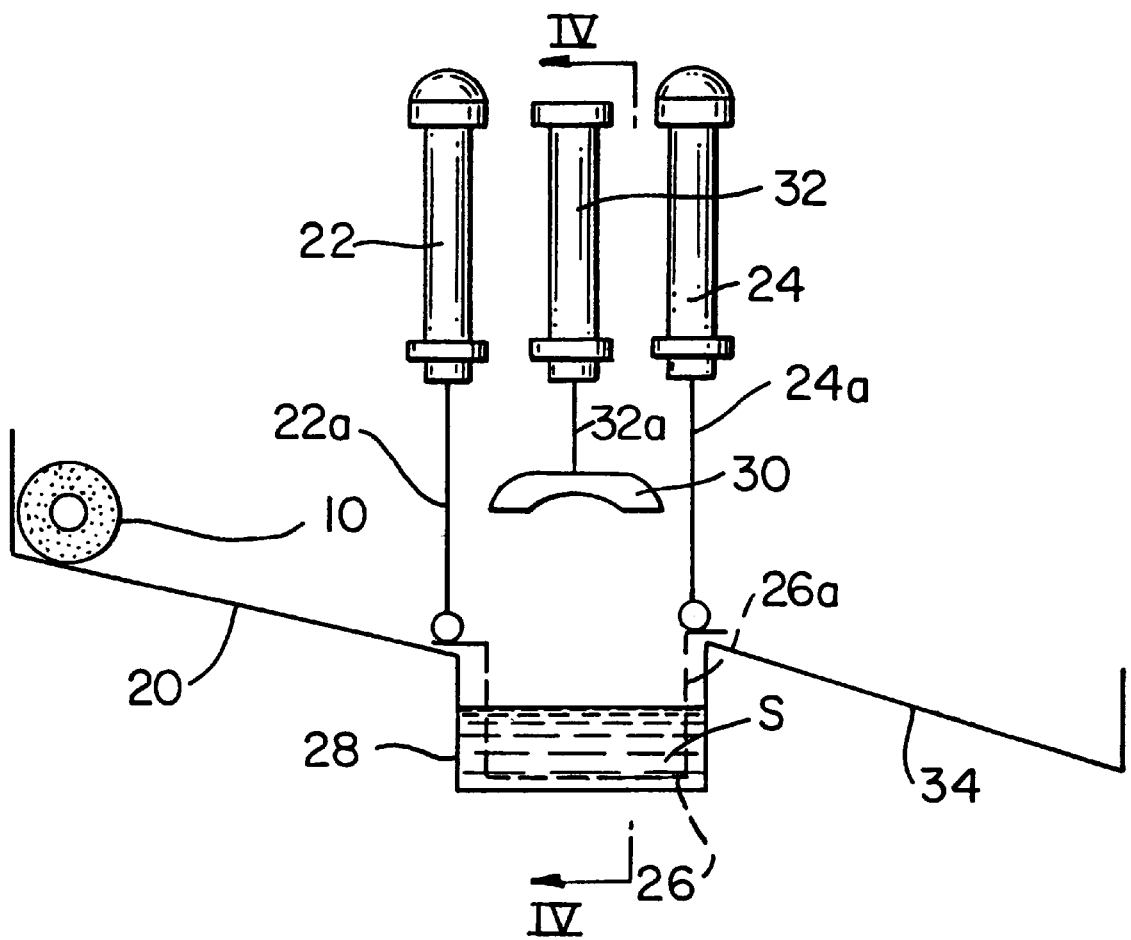
FIG. 3 is a schematic representation of the equipment used in carrying out the process of the invention, at an initial stage of operation.
Figure 4:
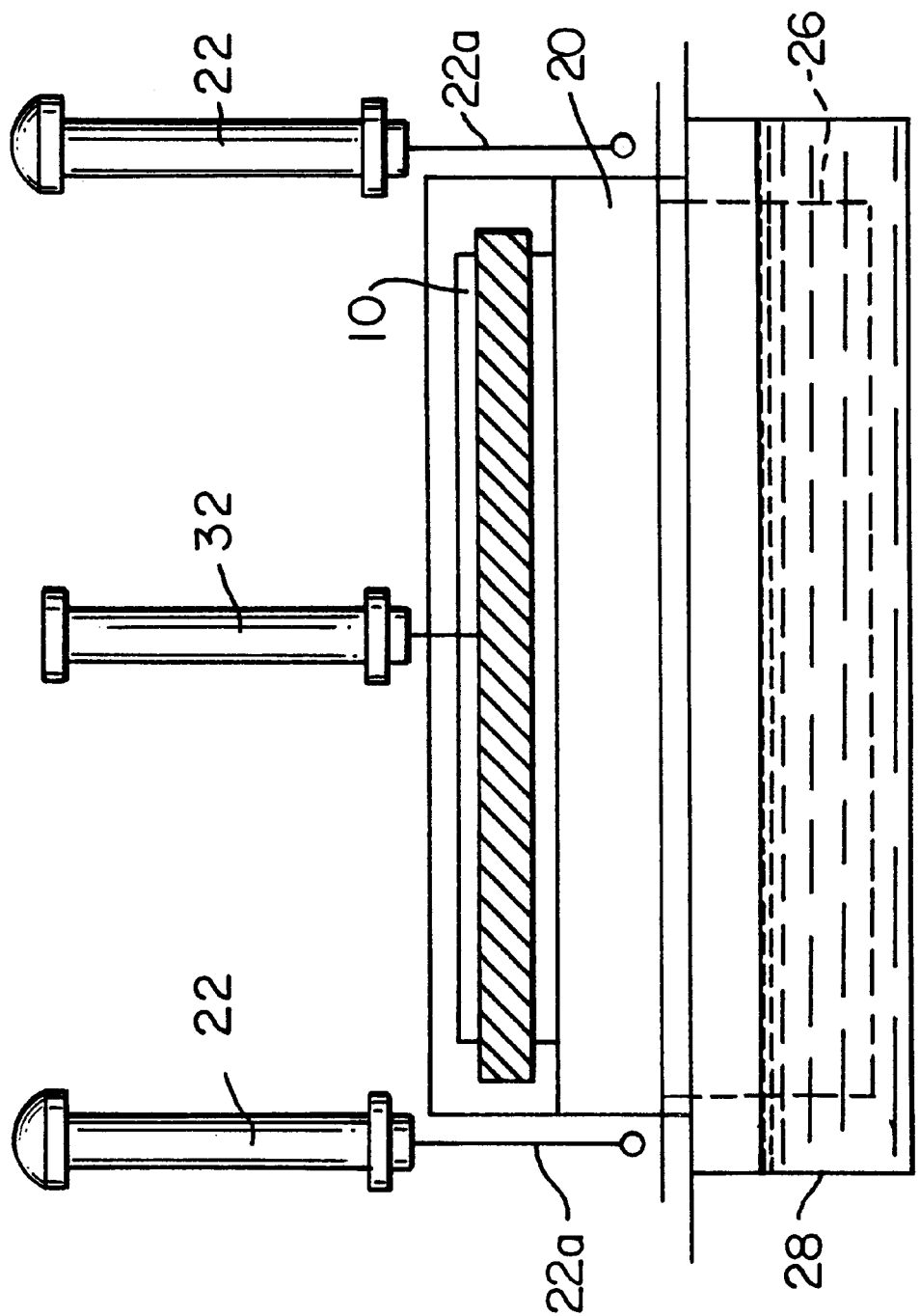
FIG. 4 is a view taken along line IV—IV of FIG. 3.
Figure 5:
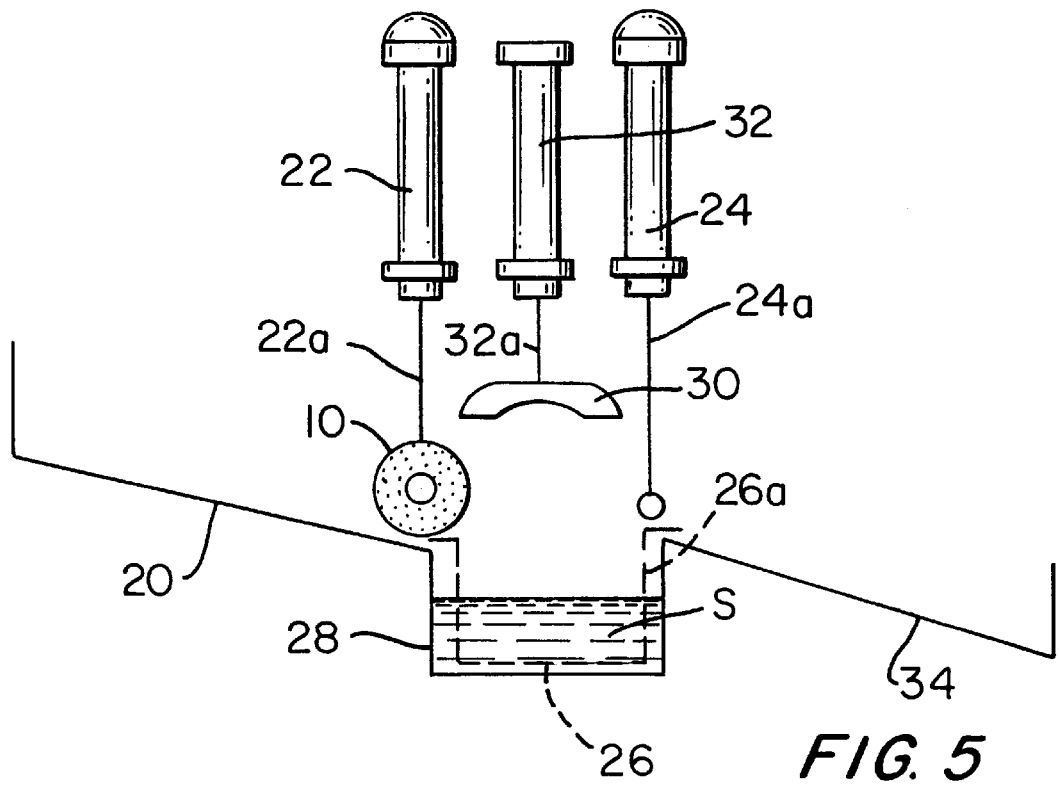
FIGS. 5–11 illustrate further stages of operation.

The basic equipment for performing the process includes a feeding hopper 20 (see FIGS. 3 and 4) on which sleeve 10 is placed, ready for processing. Two pairs of pneumatic cylinders 22, 24 are provided with displaceable piston rods 22a and 24a, holding an elongated basket 26.

The basket 26 may be of network or perforated sheet material, being generally U-shaped with one open side-wall (denoted 26a).

The basket 26 is adapted to move vertically into and out of a trough-like bath 28, which contains a liquid solution S, admixed with a suitable quantity of solid particles G ( further details are given below).

A squeezer 30 is mounted to piston rod 32a of pneumatic cylinder 32.

A discharge hopper 34 is installed along bath 28, at the other side thereof.

The process is performed in the following manner. The article to be treated (sleeve 10 in the present example) is allowed to slide down the hopper 20 into bath 28 where it becomes immersed in the solution S for a sufficient duration to ensure thorough soaking.

Figure 6:
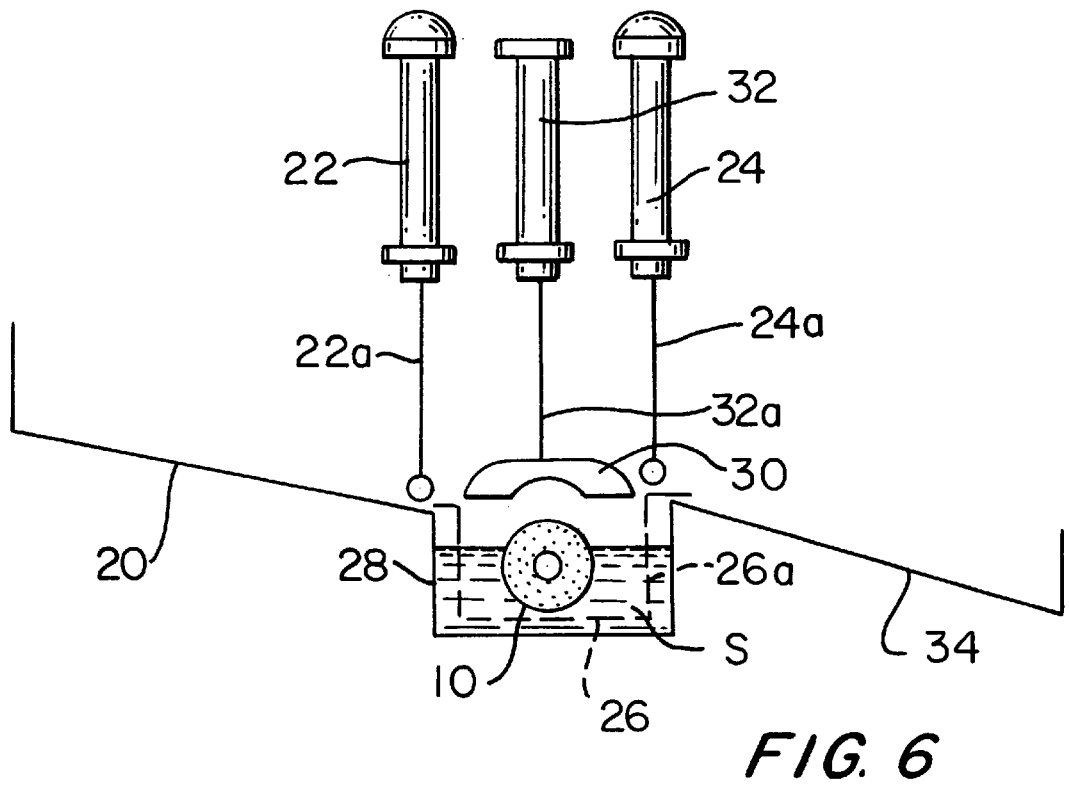
Figure 7:
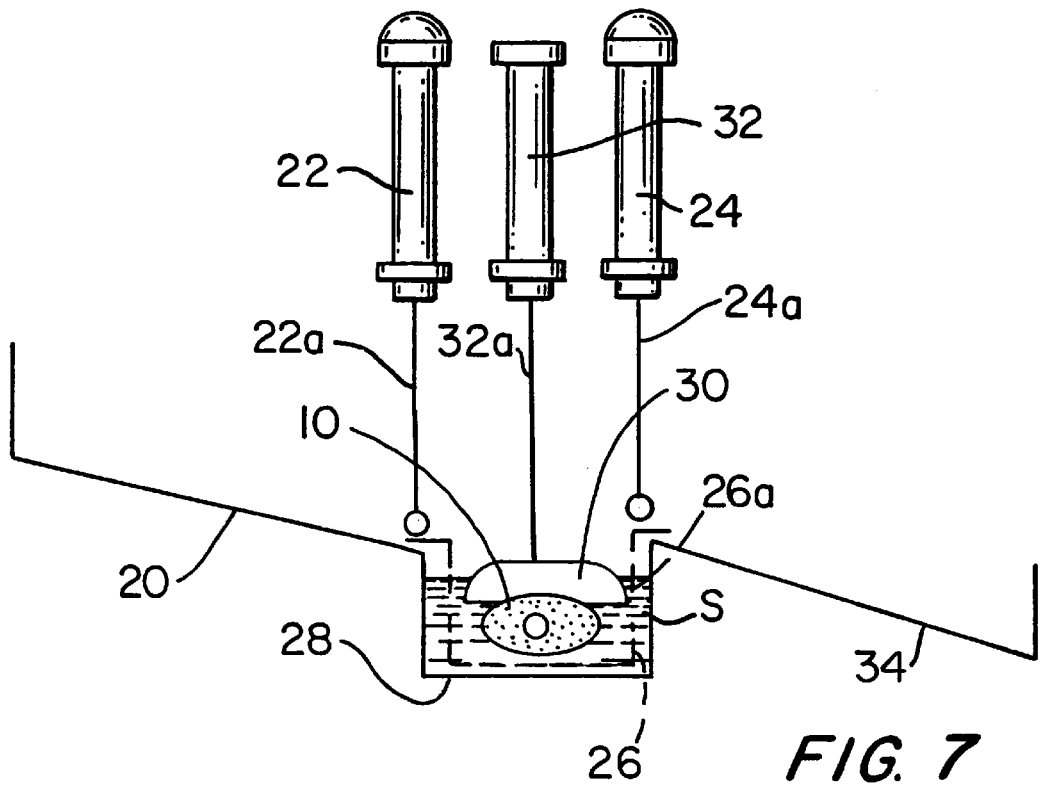

Squeezer 30 is lowered (FIG. 6) and pressed against sleeve 10 (FIG. 7), to ensure a complete soaking of the sleeve by the solution S.

Figure 8:
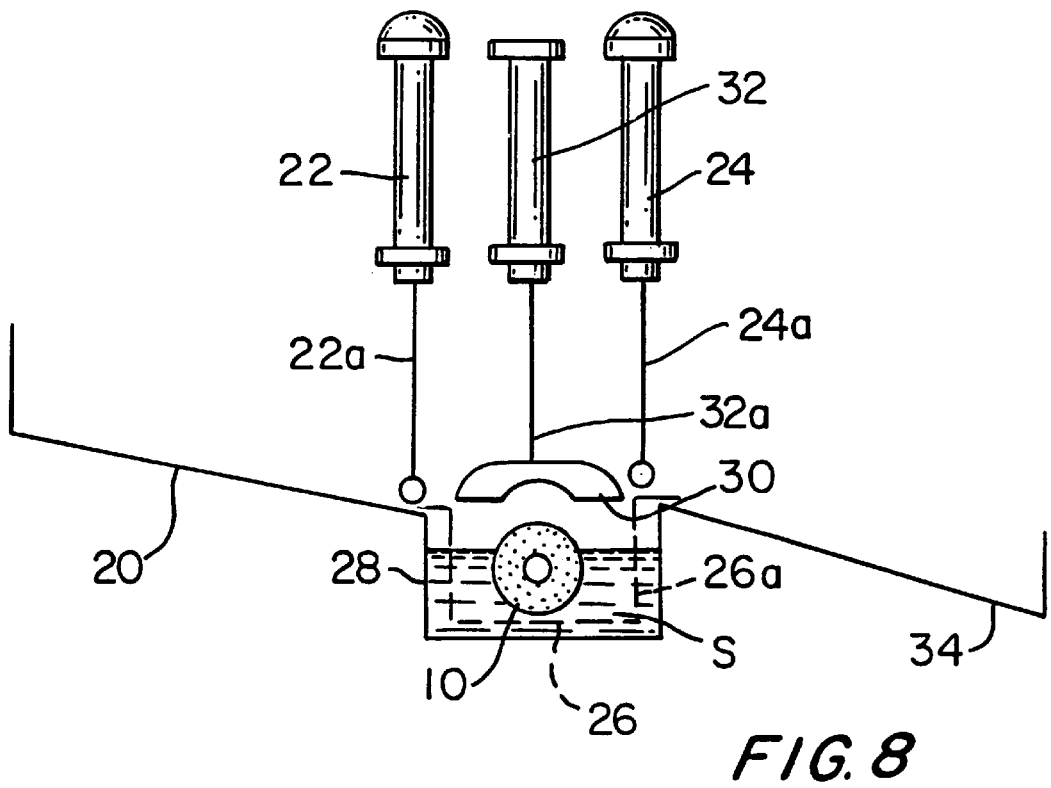

Squeezer 30 is then raised (FIG. 8) so that sleeve 10 is again allowed to absorb the solution S.

Figure 9:
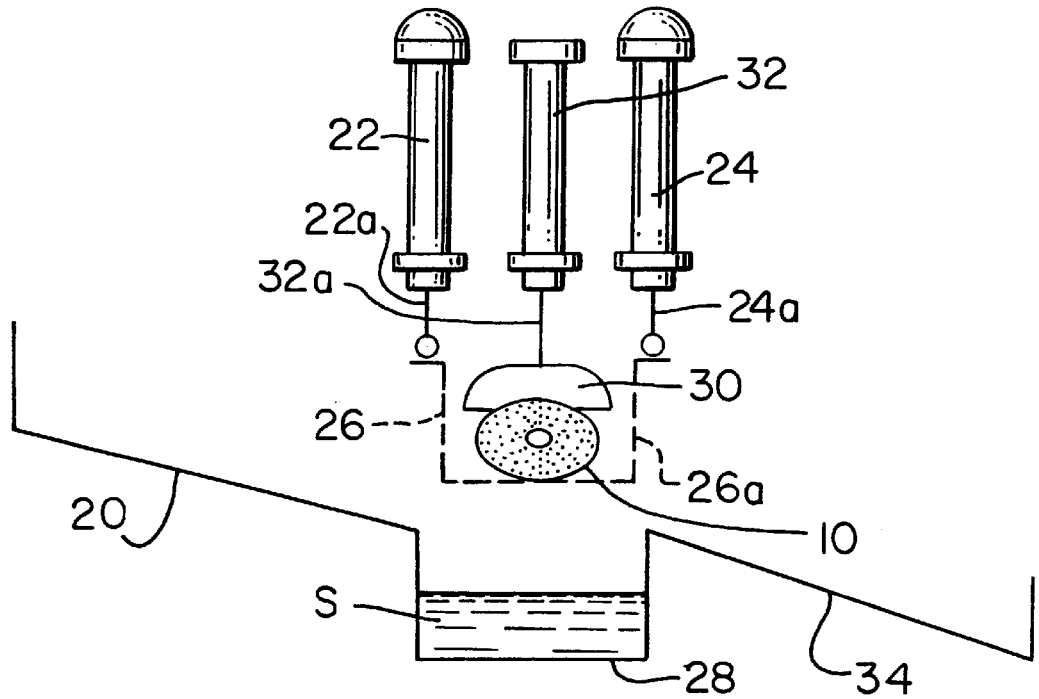

The basket 26 is lifted and a second squeezing operation takes place (FIG. 9) whereby excessive quantity of the solution is removed from the sleeve 10.

Figure 10:
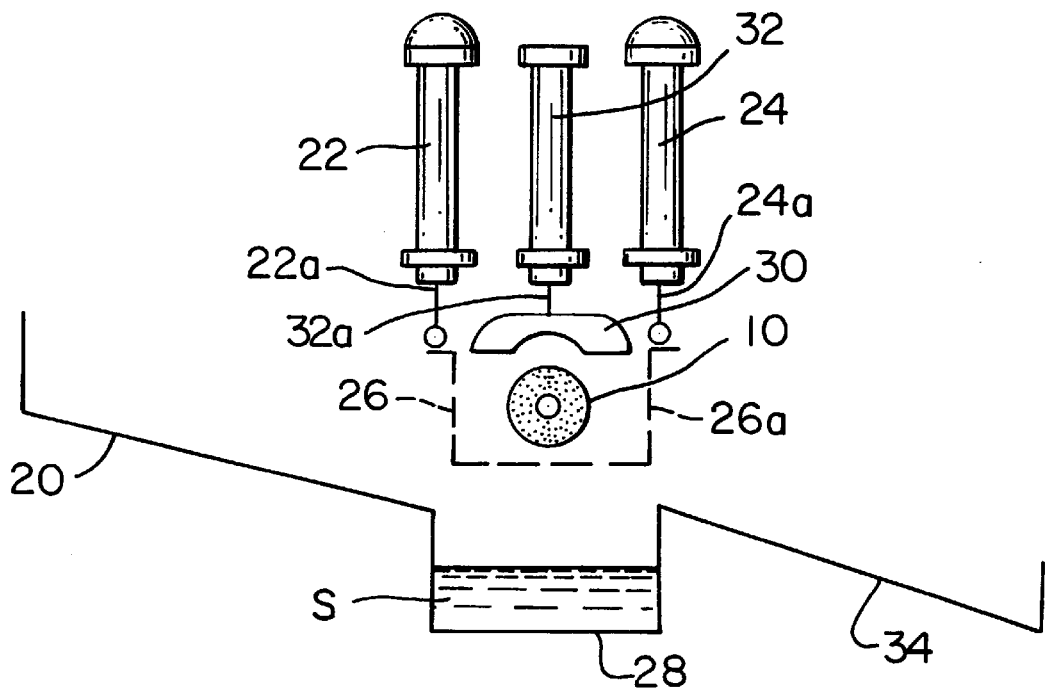
Figure 11:
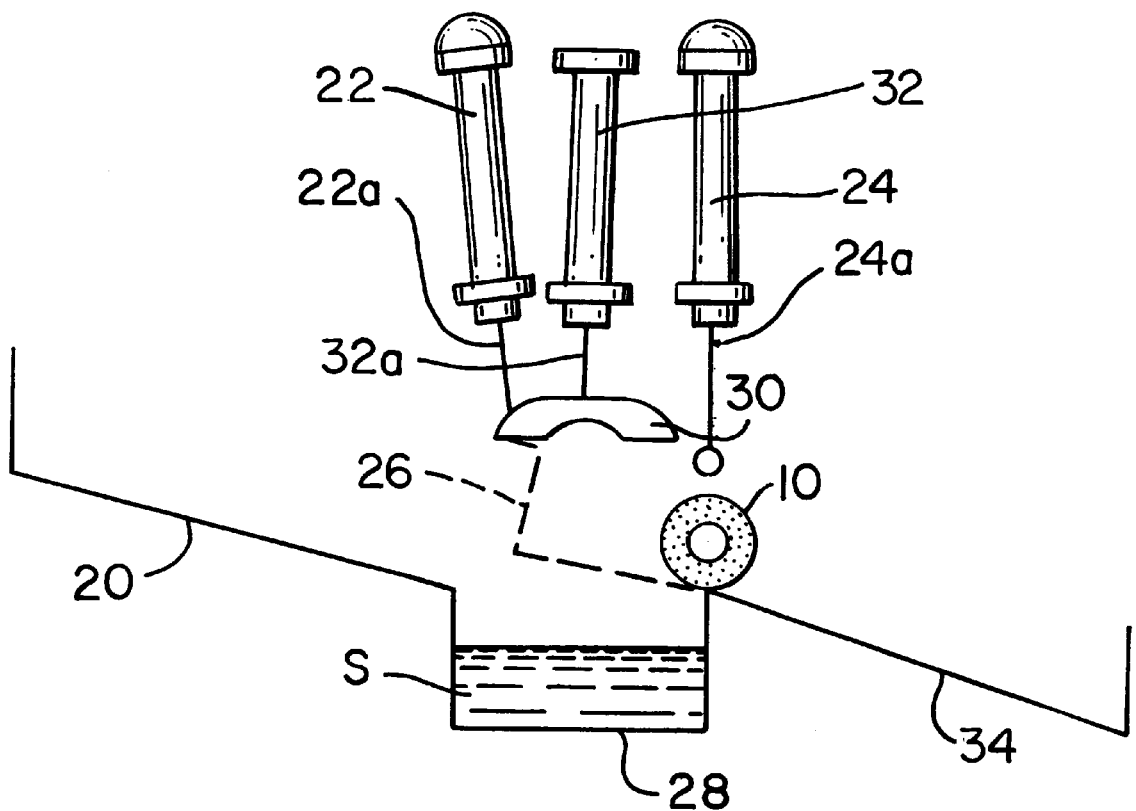

Squeezer 30 is released (FIG. 10) and the basket titled (FIG. 11) so that the sleeve 10 may roll through the open side 26a of the basket onto an unloading hopper 34, which may also form a part of a drying installation (not shown).

Figure 12:
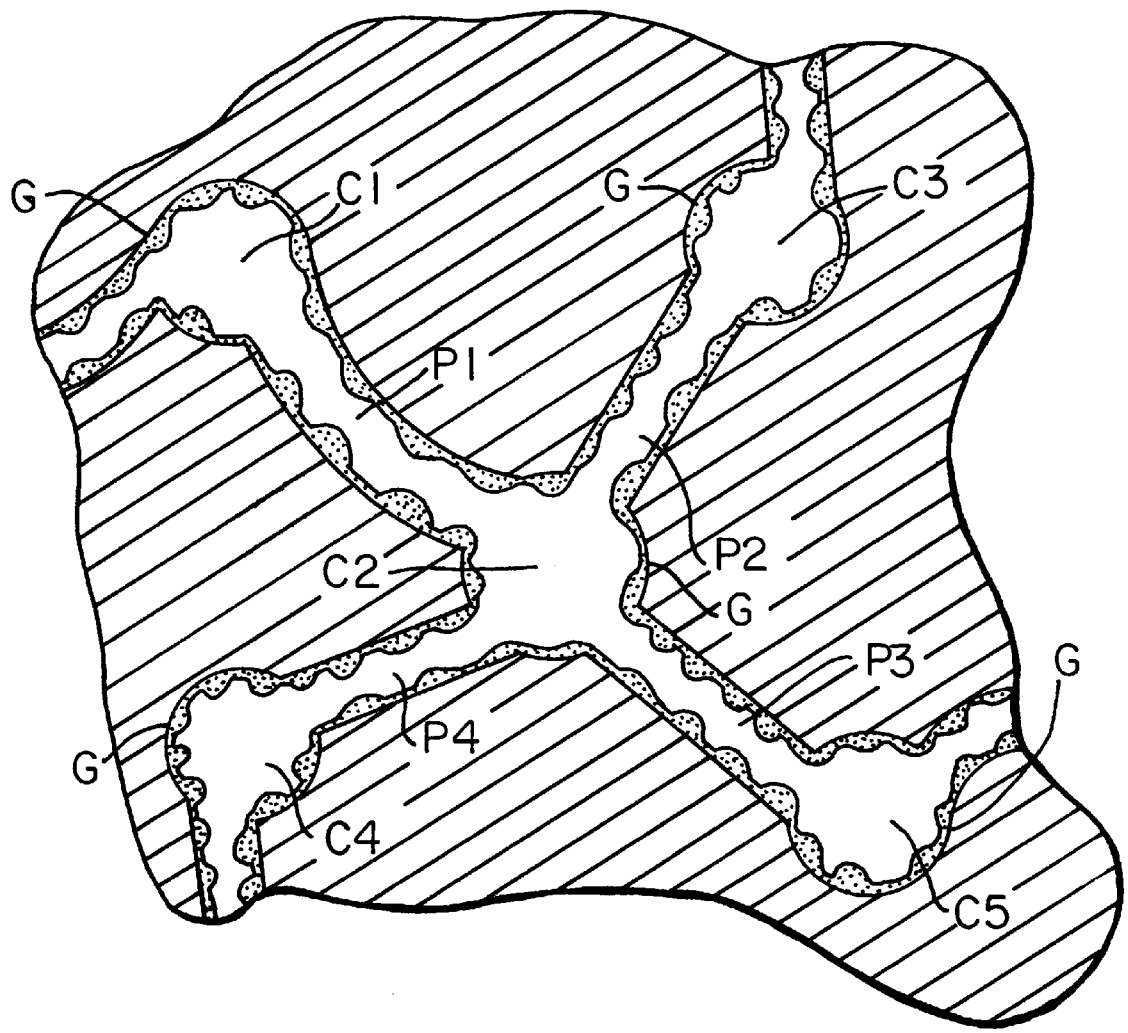
FIG. 12 illustrates the structure of the insulating material after treatment by the process of the present invention.

The outcome of this treatment is schematically depicted in FIG. 12, namely that the scattered particles G become adhered to the inner walls of the cells C and, more importantly, of the passages P, thus forming a tortuous path to restrict the flow of air therethrough.

Following are a selection of recommended formulae, and a few examples.

For best results the following proportions should be observed with respect to every finished product:

$$2I/P \leq G/g \leq I(2+a \times E)/P \quad (1);$$

and $$d \leq 10aE \quad (2)$$

wherein

G—is the weight of the product after soaking and before drying;
g—is the initial weight of product before treatment;
I—is the specific weight of the solution;
P—is the specific weight of the raw polymeric material (prior to foaming);
a=0,07—an empirical factor;
E=P/p, wherein p is the specific weight of the foamed product before the treatment; and
d—is the average size of the solid particles G (in $\mu$m).

Formula (1) thus determines the optimal solution quantity which is necessary for coating the passages within the product to form obstacles in the flow path of the air, without, however, plugging the passages altogether.

Formula (2) determines the desirable size of the particles to be used.

EXAMPLE 1

A standard heat insulating product in the form of a slab, measuring 1×1×0.1 m, and having a specific weight (p) of 28 kg/ $m^3$ was prepared of PU. of 28 kg/$m^3$. The specific weight of the raw polymeric material (P) was 1,100 kg/$m^3$. The initial weight of the product (g) was 2.8 Kg.

A solution of viscous adhesive commercially available, known under the Tradename "SERACRYL 4370" was prepared having a specific weight of 3,000 Kg/$m^3$. Mixed with the solution were particles of coal ashes and of $CaCO_3$. The size of the particles of $CaCO_3$ was in the range of 12 to 25 $\mu$m, namely less than 27 $\mu$m as prescribed by the Formula (2).

After soaking and squeezing (before drying), the weight of the product G was 20 kg.

The ratio of G/g=20/2.8=7.1, that is within the range prescribed by Formula (1) (namely between 5.45 and 13).

The article was tested in comparison with a non-treated article, and proved that its thermal-resistance increased from 100° C. to 150° C.

The thermal conductivity was reduced by about 20%.

Two treated slabs, of 40 mm (S1) and 55 mm (S2) thickness (D) respectively, have been tested for temperature gradient along distance D (mm) from a heated surface; the results are given by the following table:

| D (mm) | 0 | 10 | 20 | 30 | 40 | 50 | 55 |
|---|---|---|---|---|---|---|---|
| T° C. (S1) | 100 | 78 | 65 | 54 | 43 | — | — |
| T° C. (S2) | 150 | 120 | 96 | 79 | 61 | 49 | 42 |

EXAMPLE 2

The process of Example 1 was repeated, with the following changes.

The second squeezing stage was performed with less force so that the weight of the article (G) was 26.7 kg. The ratio of G/g=26.7/2.8=9.52, namely within the designed range of Formula (1) (between 5.45 and 13).

The article was tested and proved that the thermal-resistance increased up to 160° C. Thermal conductivity was reduced by about 10%.

EXAMPLE 3

The process of Example 1 was repeated, yielding the same results, though instead of $CaCO_3$, particles of $Mg(OH)_2$ were used (90% of the particles were under 10 $\mu$m).

EXAMPLE 4

The process of Example 1 was repeated, yielding the same results, though instead of $CaCO_3$, a mixture of $CaCO_3$ and $Mg(OH)_2$ particles was used.

EXAMPLE 5

The process of Examples 3 and 4 was repeated, yielding the same results, though instead of $Mg(OH)_2$ particles of $Al(OH)_3$ were used.

EXAMPLE 6

An insulating sleeve of 1"0 internal diameter and 30 mm wall thickness was prepared as described in Examples 1 and 3.

Temperature gradient from 100° C. was as follows:

| D (mm) | 0 | 10 | 20 | 30 |
|---|---|---|---|---|
| T° C. | 100 | 66 | 51 | 41 |

EXAMPLE 7

An insulating sleeve of 1" internal diameter and 40 mm wall thickness was prepared as described in Examples 1 and 3.

Temperature gradient from 150° C. was as follows:

| D (mm) | 0 | 10 | 20 | 30 | 40 |
|---|---|---|---|---|---|
| T° C. | 150 | 87 | 66 | 54 | 43 |

Those skilled in the art will readily understand that various changes, modifications and variations may be applied to the invention as above exemplified without departing from the scope of the invention as defined in and by the appended claims.

What is claimed is:

1. A process for improving the thermal insulation properties of articles made of polymeric foam material having open cells communicated by passages, comprising the steps of:

preparing a viscous solution capable of coating the inner walls of the passages;

mixing the solution with solid particles of a size less than the minimum diametrical length of the passages;

soaking the article with the mixed solution; and drying the article, so that the particles contained in the viscous solution are adhered to the passage walls by the viscous solution so as to partly block the flow of air between adjacent cells.

2. The process of claim 1 wherein the polymeric material is polyurethane.

3. The process of claim 2 wherein the solution comprises acrylic adhesive.

4. The process of claim 3 wherein the particles are of an inorganic material.

5. The process of claim 4 wherein the following formulae are satisfied:

$$2I/P \leqq G/g \leqq I(2+a\times E)/P(1);$$

and $$d \leqq 10aE \quad (2)$$

wherein
- G—is the weight of the product after soaking and before drying;
- g—is the initial weight of product before treatment;
- I—is the specific weight of the solution;
- P—is the specific weight of the raw polymeric material (prior to foaming);
- a—is an empirical factor, ranging between 0,006–0,009;
- E=P/p, wherein p is the specific weight of the foamed product before treating; and
- d—is the average size of the solid particles ( in $\mu$m).

6. The process of claim 5 wherein the particles are of a size less than 35 microns.

7. The process of claim 4 wherein the inorganic material is of the group consisting of $Mg(OH)_2$ or $Al(OH)_3$.

8. The process of claim 7 wherein the inorganic material further comprises $CaCO_3$.

9. The process of claim 8 wherein the inorganic material further comprising coal ashes.

10. The process of claim 1 wherein the soaking is attained by immersing the article in a bath of the solution.

11. The process of claim 10 further comprising the step of squeezing the article subsequent to said soaking.

12. The process of claim 11 wherein the squeezing is attained by pressing the article against a perforated surface.

13. The process of claim 12 wherein the perforated surface forms the bottom wall of a basket by which the article is lifted from the bath.

14. A thermal insulating article, made of open cells polymeric foamed material interconnected by passages, wherein the passages are partly blocked against the flow of air therethrough by solid particles adhered to the inner walls of the passages by a viscous solution so as to improve the thermal insulation properties of the article.

15. The article of claim 14 wherein the polymeric foamed material is polyurethane.

16. The article of claim 15 wherein the solution comprises an acrylic adhesive.

17. The article of claim 16 wherein the solid particles are of the group consisting of $Mg(OH)_2$ or $Al(OH)_3$.

18. The article of claim 17 wherein said solid particles further comprise $CaCO_3$.

19. The article of claim 18 wherein the solid particles further comprise coal ashes.

20. The article of claim 19 wherein the size of the particles is less than 35 microns.

* * * * *